US012591247B2

(12) United States Patent (10) Patent No.: US 12,591,247 B2
McCoy et al. (45) Date of Patent: Mar. 31, 2026

(54) UNMANNED VEHICLE MANAGEMENT SYSTEM AND METHOD

(71) Applicant: Firestorm Labs, Inc., San Diego, CA (US)

(72) Inventors: Chad McCoy, San Diego, CA (US); Dan Magy, San Diego, CA (US); Ian Muceus, San Diego, CA (US); Brett Barbee, San Diego, CA (US)

(73) Assignee: Firestorm Labs, Inc., San Diego, CA (US)

( * ) Notice: Subject to any disclaimer, the term of this patent is extended or adjusted under 35 U.S.C. 154(b) by 0 days.

(21) Appl. No.: 18/658,890

(22) Filed: May 8, 2024

(65) Prior Publication Data

US 2025/0258495 A1 Aug. 14, 2025

Related U.S. Application Data

(60) Provisional application No. 63/500,738, filed on May 8, 2023.

(51) Int. Cl.
G05D 1/222 (2024.01)
G05D 1/226 (2024.01)

(52) U.S. Cl.
CPC .............. G05D 1/222 (2024.01); G05D 1/226 (2024.01)

(58) Field of Classification Search
CPC ...... G05D 1/222; G05D 1/226; G05D 1/0022; G06Q 30/018; B64C 39/024; G06F 8/65; G06F 16/29; G06F 21/31; G06F 21/44; G06F 21/6227; G06F 2221/2117; G08G 5/22; G08G 5/25; G08G 5/26; G08G 5/32; G08G 5/34; G08G 5/53; G08G 5/55; G08G 5/56; G08G 5/57; G08G 5/59; G08G 5/723; G08G 5/727; G08G 5/74; G08G 5/76; G08G 5/58; H04L 63/101; H04L 67/12; H04L 67/34; B64U 10/13; B64U 30/20; B64U 2101/30; B64U 2201/102; B64U 2201/20; H04W 4/021; Y04S 40/20

See application file for complete search history.

(56) References Cited

U.S. PATENT DOCUMENTS

| | | | |
|---|---|---|---|
| 3,218,005 | A | 11/1965 | Alvarez |
| 8,068,949 | B2 | 11/2011 | Duggan et al. |

(Continued)

FOREIGN PATENT DOCUMENTS

| | | |
|---|---|---|
| CN | 102923296 A | 2/2013 |
| CN | 105771269 A | 7/2016 |

(Continued)

*Primary Examiner* — Nga X Nguyen

(74) *Attorney, Agent, or Firm* — Perkins Coie LLP

(57) ABSTRACT

Disclosed are systems, methods, computer program products, and devices for fully- or semi-autonomously managing the launch and movement of an unmanned vehicle or fleet of unmanned vehicles. In some aspects, a system includes a centralized data management system in communication over a network (e.g., public or private network) with a coded (fleet of) unmanned vehicle(s) and client devices that are distributed throughout areas of interest and operable by remote users to remotely program instructions for controlling one or more activities or tasks of the unmanned vehicle with complete secrecy of the instructions and anonymity of the remote user between client devices.

20 Claims, 5 Drawing Sheets

(56)                    References Cited

U.S. PATENT DOCUMENTS

| | | | |
|---|---|---|---|
| 8,068,950 B2 | 11/2011 | Duggan et al. |
| 8,082,074 B2 | 12/2011 | Duggan et al. |
| 8,103,398 B2 | 1/2012 | Duggan et al. |
| 8,355,834 B2 | 1/2013 | Duggan et al. |
| 8,380,425 B2 | 2/2013 | Duggan et al. |
| 8,700,306 B2 | 4/2014 | Duggan et al. |
| 8,768,555 B2 | 7/2014 | Duggan et al. |
| 8,882,560 B2 | 11/2014 | Sofman et al. |
| 9,108,729 B2 | 8/2015 | Duggan et al. |
| 9,254,363 B2 | 2/2016 | Levien et al. |
| 9,713,675 B2 | 7/2017 | Levien et al. |
| 10,112,711 B2 | 10/2018 | Hanna et al. |
| 11,027,584 B1 | 6/2021 | Kiceniuk, Jr. |
| 11,355,021 B1 | 6/2022 | Miao |
| 11,450,233 B2 | 9/2022 | Becker et al. |
| 11,521,512 B2 | 12/2022 | Marquinez Torrecilla et al. |
| 11,708,159 B2 | 7/2023 | Marshall et al. |
| 11,721,231 B2 | 8/2023 | Becker et al. |
| 11,981,460 B2 | 5/2024 | Muceus et al. |
| 12,139,280 B2 | 11/2024 | Muceus et al. |
| 12,202,634 B1 | 1/2025 | England et al. |
| 12,236,494 B1 | 2/2025 | Melgar et al. |
| 12,240,634 B1 | 3/2025 | Muceus et al. |
| 2009/0026321 A1 | 1/2009 | Sarh et al. |
| 2009/0166477 A1 | 7/2009 | Bousfield |
| 2010/0159434 A1 | 6/2010 | Lampotang et al. |
| 2010/0178966 A1 | 7/2010 | Seydoux |
| 2011/0036939 A1 | 2/2011 | Easter |
| 2011/0130913 A1 | 6/2011 | Duggan et al. |
| 2011/0221692 A1 | 9/2011 | Seydoux et al. |
| 2012/0123628 A1 | 5/2012 | Duggan et al. |
| 2013/0345920 A1 | 12/2013 | Duggan et al. |
| 2014/0025229 A1 | 1/2014 | Levien et al. |
| 2014/0324253 A1 | 10/2014 | Duggan et al. |
| 2015/0234387 A1 * | 8/2015 | Mullan ................... H04L 67/12 |
| | | 701/28 |
| 2017/0066135 A1 | 3/2017 | Cohen et al. |
| 2017/0185081 A1 | 6/2017 | Steele et al. |
| 2018/0211263 A1 * | 7/2018 | Gong ........................ G08G 5/76 |
| 2018/0297698 A1 | 10/2018 | Dhall |
| 2018/0334248 A1 | 11/2018 | Neiser |
| 2019/0051051 A1 | 2/2019 | Kaufman et al. |
| 2020/0188732 A1 | 6/2020 | Kruger |
| 2020/0216196 A1 | 7/2020 | Sohmshetty et al. |
| 2020/0310408 A1 | 10/2020 | Carper et al. |
| 2021/0082304 A1 | 3/2021 | Daley et al. |
| 2021/0174695 A1 | 6/2021 | Clark |
| 2021/0232873 A1 | 7/2021 | Kothari et al. |
| 2021/0256875 A1 | 8/2021 | Mosier et al. |
| 2021/0284335 A1 | 9/2021 | Mclaughlin et al. |
| 2021/0300550 A1 | 9/2021 | Owen et al. |
| 2022/0144428 A1 | 5/2022 | Harring, III |
| 2022/0351628 A1 | 11/2022 | Ali et al. |
| 2022/0365534 A1 | 11/2022 | Kuhlman et al. |
| 2023/0186776 A1 | 6/2023 | Speasl et al. |
| 2024/0185736 A1 | 6/2024 | Prodzenko et al. |
| 2024/0208637 A1 | 6/2024 | Alley et al. |
| 2024/0294279 A1 | 9/2024 | Muceus et al. |
| 2024/0339046 A1 | 10/2024 | Paull et al. |
| 2024/0371290 A1 | 11/2024 | Kane et al. |
| 2025/0021101 A1 | 1/2025 | Koch |
| 2025/0026506 A1 | 1/2025 | Robbins-rothman et al. |
| 2025/0033809 A1 | 1/2025 | Jiang et al. |
| 2025/0058904 A1 | 2/2025 | Muceus et al. |
| 2025/0108943 A1 | 4/2025 | Sekiguchi et al. |
| 2025/0153871 A1 | 5/2025 | Liu et al. |
| 2025/0155785 A1 | 5/2025 | Tian et al. |
| 2025/0197038 A1 | 6/2025 | Muceus et al. |

FOREIGN PATENT DOCUMENTS

| | | |
|---|---|---|
| CN | 106671402 A | 5/2017 |
| CN | 112061372 A | 12/2020 |
| CN | 112158323 A | 1/2021 |
| EP | 3525259 A1 | 8/2019 |
| FR | 3025491 A1 | 3/2016 |
| FR | 3109369 A1 | 10/2021 |
| IN | 201941005768 | 2/2019 |
| WO | 2019125159 A1 | 6/2019 |
| WO | 2019212553 A1 | 11/2019 |
| WO | 2020264115 A1 | 12/2020 |

* cited by examiner

110

400

410

Process information pertaining to a mission for an unmanned vehicle affiliated with a code that is tagged with/to the unmanned vehicle

420

Produce one or more divided data set(s) of the information to selectively provide to remote client devices at location nodes of the unmanned vehicle's mission

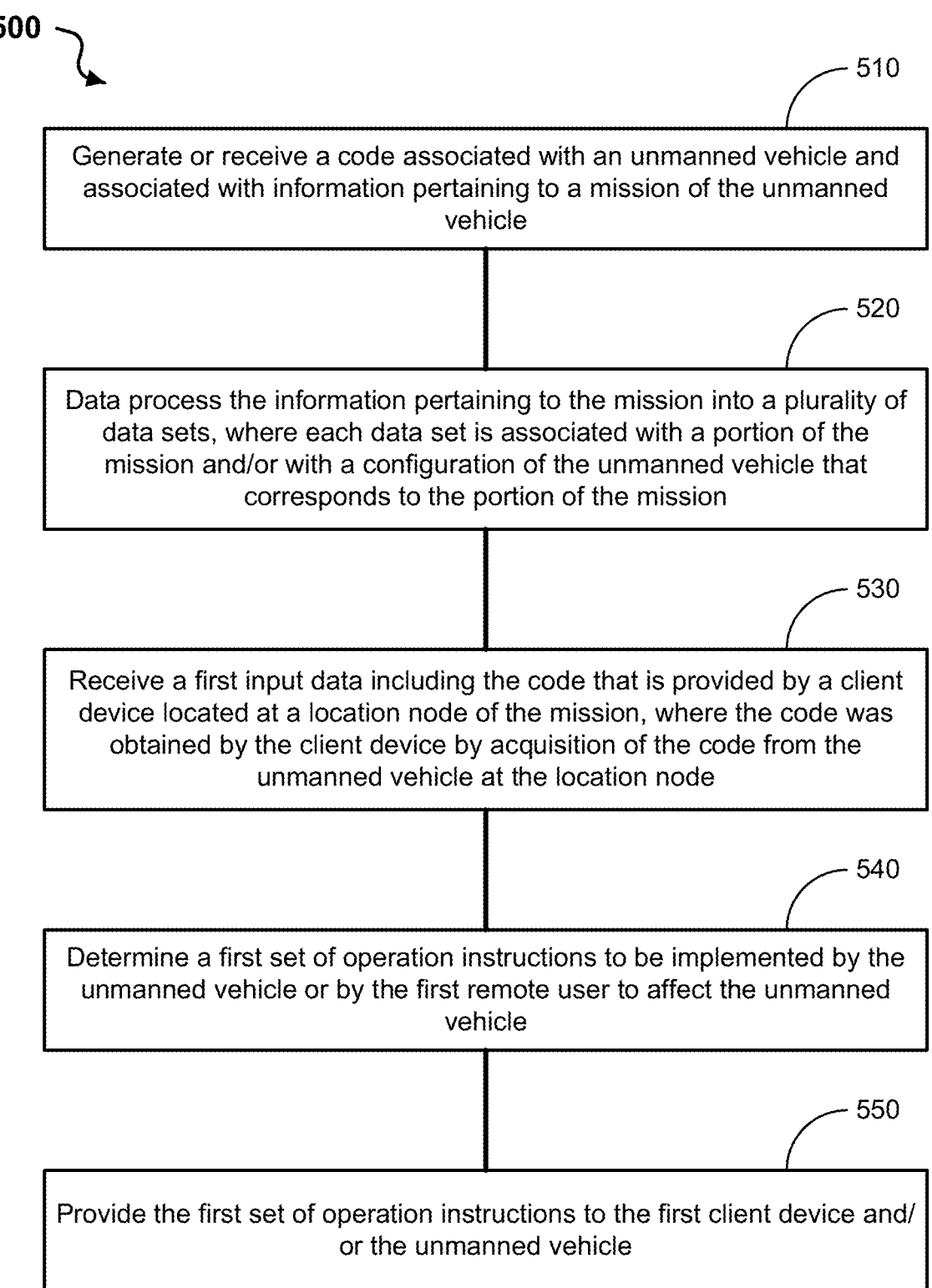

500

510

Generate or receive a code associated with an unmanned vehicle and associated with information pertaining to a mission of the unmanned vehicle

520

Data process the information pertaining to the mission into a plurality of data sets, where each data set is associated with a portion of the mission and/or with a configuration of the unmanned vehicle that corresponds to the portion of the mission

530

Receive a first input data including the code that is provided by a client device located at a location node of the mission, where the code was obtained by the client device by acquisition of the code from the unmanned vehicle at the location node

540

Determine a first set of operation instructions to be implemented by the unmanned vehicle or by the first remote user to affect the unmanned vehicle

550

Provide the first set of operation instructions to the first client device and/ or the unmanned vehicle

FIG. 5

UNMANNED VEHICLE MANAGEMENT SYSTEM AND METHOD

CROSS-REFERENCE TO RELATED APPLICATIONS

This patent document claims priority to and the benefits of U.S. Provisional Patent Application No. 63/500,738, filed on May 8, 2023. The entire contents of the afore-mentioned patent application are incorporated by reference as part of the disclosure of this application.

TECHNICAL FIELD

This patent document generally relates to unmanned vehicles, and particularly to data management and control technology.

BACKGROUND

An unmanned vehicle is a vehicle capable of sensing its environment and moving without a human operator transported by the vehicle and/or necessarily in control of the vehicle. Unmanned vehicles can use programmable navigation technology for sensing the position and movement of the vehicle and, based on the sensing, for fully- or semi-autonomously controlling the vehicle to navigate towards a destination. In some instances, unmanned vehicle navigation can include at least partial control of the vehicle's movements during some or all stages of the navigated travel.

An unmanned vehicle of the present disclosure includes a fully-autonomous vehicle and a semi-autonomous vehicle.

SUMMARY

Disclosed are systems, methods, computer program products, and devices for fully- or semi-autonomously managing the launch and movement of an unmanned vehicle or fleet of unmanned vehicles, including unmanned aerial vehicles (UAV) ("aerial drone"), unmanned land vehicles (ULV) ("land drone" or "ground drone"), and unmanned marine vehicles (UMV) ("marine drone" or "water drone").

In some embodiments, an unmanned vehicle management (UVM) system includes a centralized data management system in communication over a network (e.g., public or private network) with a coded unmanned vehicle (or fleet of coded unmanned vehicles) and client devices that are distributed throughout areas of interest and operable by remote users to remotely program instructions for controlling one or more activities or tasks of the unmanned vehicle with complete secrecy of the instructions and anonymity of the remote user between client devices.

In some implementations, for example, the centralized data management system can transfer a plurality of separate instruction sets to a plurality of different client devices in different locations to program the travel plan of a coded unmanned vehicle (e.g., flight plan of a UAV) between the different locations. In some implementations, for example, the instruction sets provided to the client device(s) can include operational instructions to be implemented by the unmanned vehicle itself or by the remote user to affect the unmanned vehicle, including but not limited to, instructions to perform a maintenance task or routine for the unmanned vehicle, a refueling task, and/or a payload loading, unloading, or modification task. For example, these tasks or routines can be known or unknown to the remote user and/or the originator of a mission for the UAV. The concept of unwitting support networks to fuel and refit the UAV can provide obfuscation to support a myriad of commercial applications of private payload deliveries requiring a high degree of confidentiality and of defense and intelligence applications supporting sensitive security missions.

In some implementations, for example, the coded unmanned vehicle(s) include a scannable wireless signal code and/or a unique physical, imageable code (e.g., QR code) that allow for the client device, such as a smartphone or smartwearable, to use an integrated wireless signal receiver and/or image capture device (e.g., camera), respectively, and as wireless transmitter or transceiver to scan and send the code to the centralized data management system via a globally connected and/or secured network (e.g., such as a commercial global network like the Internet or a private, restricted network like a militarily network) to manage unmanned vehicle(s)'s task or mission plan (e.g., destination, departure, arrival, etc.) and/or usage (e.g., payload carry, payload distribution, pricing, etc.). For example, in example embodiments of the coded unmanned vehicle using a wireless signal code, a data processing unit of the unmanned vehicle can utilize software (e.g., programmed in an operating system (OS) or application (app) stored in memory of and executed by a processor of the data processing unit) to produce (e.g., transmit) a wireless coded signal that can be received by the client device of the remote user, e.g., such as through wireless protocol like Bluetooth, Bluetooth Low Energy, ZigBee, Wi-Fi, or infrared signal, or other. Also, for example, in example embodiments of the coded unmanned vehicle using a physical, imageable code, such as a QR code, the physical, imageable code can be affixed on an outer surface of the unmanned vehicle's casing to allow for the remote user's client device to use an image capture device of the client device to scan the code and send the data from the scanned code to the centralized data management system via a globally connected and/or secured network.

In various example implementations of the UVM system, the exemplary coded signal can provide options to enable remote users to quickly repurpose the unmanned vehicle (e.g., UAV) to carry out a variety of missions confidentially, including modifying aspects of the mission in real time (e.g., during implementation of the mission), which can be implemented through a software application-based management system that can be controlled in any of an open source, private proprietary, and/or classified controlled platforms.

In some embodiments, a method for mission management of unmanned vehicle(s) includes processing information pertaining to a mission for an unmanned vehicle affiliated with a code (e.g., wireless signal code and/or physical imageable code) tagged with/to the unmanned vehicle, and providing a particular data set or data sets of divided data sets of the information to client devices at location nodes of the unmanned vehicle's mission to direct (i) particular tasks to be performed by remote users of the client devices on the unmanned vehicle at the particular location node and/or (ii) particular configuration (e.g., programmable configuration) of the unmanned vehicle to program the unmanned vehicle to operate for a next portion of the mission. For example, implementations of the method can enable extended range for a clandestine, confidential, or otherwise private sortie or mission of the unmanned vehicle(s) beyond what would otherwise be required to execute one single clandestine, confidential or private sortie or mission without involving other personnel or resources. Moreover, implementations of the method can provide the ability to indefinitely support UVM systems across geography and environments that typically would require much larger and capable platforms and infrastructure, e.g., thereby allowing such missions in remote environments.

In some embodiments, an unmanned vehicle management system includes a centralized data management system comprising one or more computing devices; a client device comprising a data processor and in communication with the centralized data management system; and an unmanned vehicle comprising an electronics unit and having a code configured in a physical format or a wireless signal format that is operable to be acquired by the client device, wherein the code of the unmanned vehicle is usable to enable access to segmented data associated with a mission of the unmanned vehicle provided by the centralized data management system that is received and used by a particular client device, wherein the centralized data management system is configured to store and process data associated with the mission of the unmanned vehicle.

In some embodiments, a method for confidential mission management of an unmanned vehicle includes generating or receiving, at a data management system comprising one or more computing devices, a code associated with an unmanned vehicle and associated with information pertaining to a mission of the unmanned vehicle, wherein the code is configured in at least one of a physical format or a wireless signal format that is coupled to the unmanned vehicle; processing, at the data management system, the information pertaining to the mission into a plurality of data sets, where each data set is associated with a portion of the mission and a configuration of the unmanned vehicle corresponding to the portion of the mission; receiving a first input data including the code at a first client device of a first remote user located at a first location node of the mission, wherein the code was obtained by the first client device by a scan of the code from the unmanned vehicle at the first location node; processing, at the data management system, the first input data to determine a first set of operation instructions to be implemented by the unmanned vehicle or by the first remote user to affect the unmanned vehicle, wherein the first set of operation instructions include at least one of a first maintenance task for the unmanned vehicle, a first refueling task of the unmanned vehicle, or a first payload loading, payload unloading, or payload modification task for the unmanned vehicle, or a digital command set including a travel plan, propulsion plan, or navigation plan for the unmanned vehicle; and transmitting, by the data management system, the first set of operation instructions to one or both of the first client device and the unmanned vehicle.

The subject matter described in this patent document can be implemented in specific ways that provide one or more of the following features.

BRIEF DESCRIPTION OF THE DRAWINGS

FIG. 5 shows a diagram of an example embodiment of a method for confidential mission management of unmanned vehicle(s), in accordance with the present technology.

DETAILED DESCRIPTION

Figure 1:
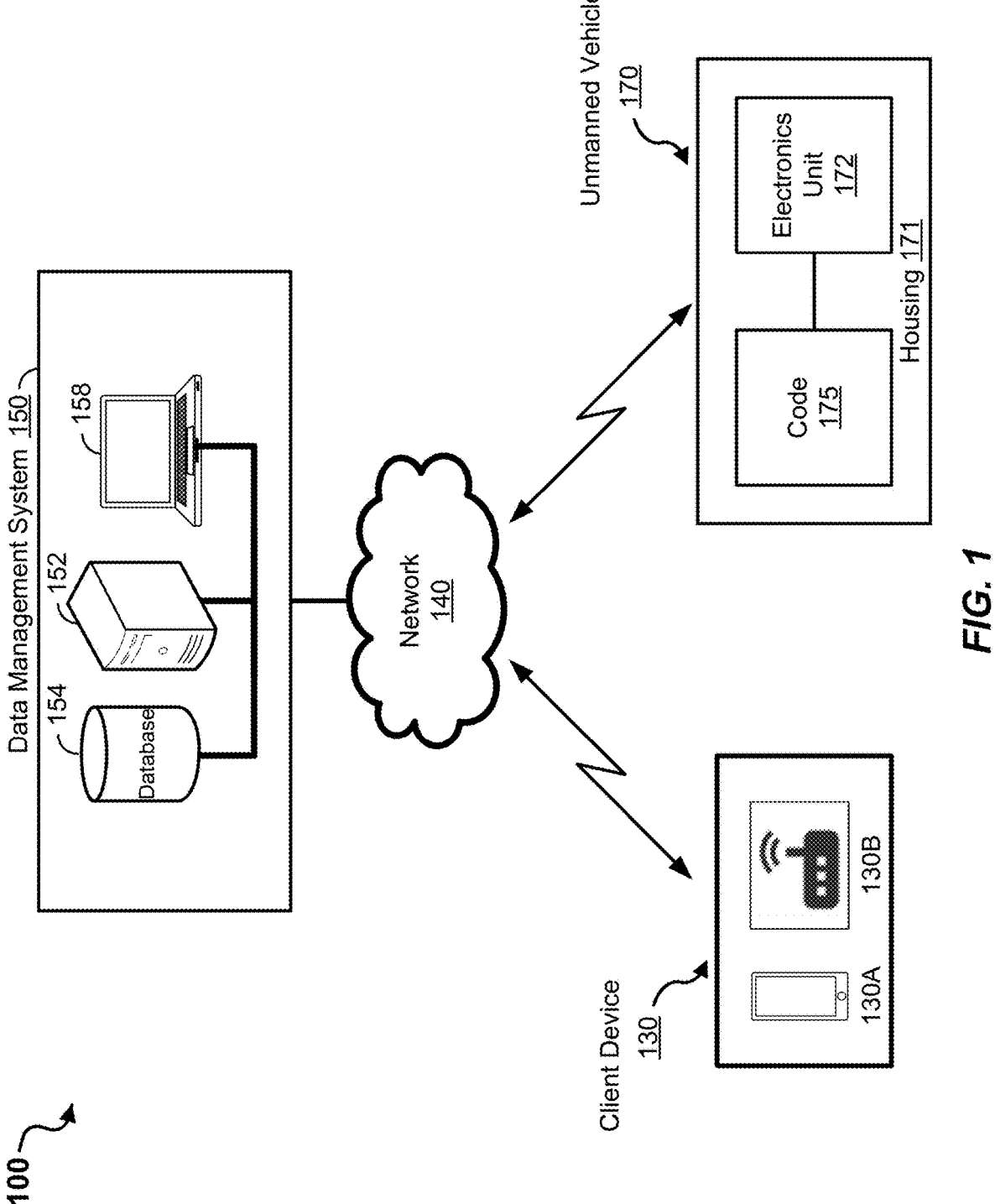
FIG. 1 shows a diagram of an example embodiment of an unmanned vehicle management system in accordance with the present technology.

Disclosed are systems, methods, computer program products, and devices for fully- or semi-autonomously managing the launch and movement of an unmanned vehicle, including unmanned aerial vehicles (UAV) ("aerial drone"), unmanned land vehicles (ULV) ("land drone" or "ground drone"), and unmanned marine vehicles (UMV) ("marine drone" or "water drone").

In some aspects, an unmanned vehicle management (UVM) system includes a centralized data management system in communication over a network (e.g., public or private network) with a coded unmanned vehicle (fleet of coded unmanned vehicles) and client devices that are distributed throughout areas of interest and operable by remote users to remotely program instructions for controlling one or more activities or tasks of the unmanned vehicle with complete secrecy of the instructions and anonymity of the remote user between client devices.

In some implementations, for example, the centralized data management system can transfer a plurality of separate instruction sets to a plurality of different client devices in different locations to program the travel plan of a coded unmanned vehicle (e.g., flight plan of a UAV) between the different locations. In some implementations, for example, the instruction sets provided to the client device(s) can include operational instructions to be implemented by the unmanned vehicle itself or by the remote user to affect the unmanned vehicle, including but not limited to, instructions to perform a maintenance task or routine for the unmanned vehicle, a refueling task, and/or a payload loading, unloading, or modification task. For example, these tasks or routines can be known or unknown to the remote user and/or the originator of a mission for the UAV. The concept of unwitting support networks to fuel and refit the UAV can provide obfuscation to support a myriad of commercial applications of private payload deliveries requiring a high degree of confidentiality and of defense and intelligence applications supporting sensitive security missions. For example, in some implementations, the centralized data management system and/or the client device can provide a status update or report to the system on the status of the mission and/or the coded unmanned vehicle (e.g., UAV), e.g., including that the unmanned vehicle is fully operational through maintenance, engine checks, fuel status, safety, and/or required structural repairs and available for operation of the next leg of travel to be completed.

In some implementations, for example, the coded unmanned vehicle(s) include a scannable wireless signal code and/or a unique physical, imageable code (e.g., QR code) that allow for the client device, such as a smartphone, smart watch, smart glasses, etc., to use an integrated wireless signal receiver and/or image capture device (e.g., camera), respectively, and as wireless transmitter or transceiver to scan and send the code to the centralized data management system via a globally connected and/or secured network (e.g., such as a commercial global network like the Internet or a private, restricted network like a military network) to manage unmanned vehicle(s)'s task or mission plan (e.g., destination, departure, arrival, etc.) and/or usage (e.g., payload carry, payload distribution, pricing, etc.). In some implementations, the exemplary coded signal can provide options to enable remote users to quickly repurpose the unmanned vehicle (e.g., UAV) to carry out a variety of missions confidentially, including modifying aspects of the mission in real time (e.g., during implementation of the mission), which can be implemented through a software application-based management system that can be controlled in any of an open source, private proprietary, and/or classified controlled platforms.

For example, in example embodiments of the coded unmanned vehicle using a wireless signal code, a data processing unit of the unmanned vehicle can utilize software (e.g., programmed in an operating system (OS) or application (app) stored in memory of and executed by a processor of the data processing unit) to produce (e.g., transmit) a wireless coded signal that can be received by the client device of the remote user, e.g., such as through wireless communication protocol like Bluetooth®, Bluetooth® Low Energy (BLE), ZigBee, Near Field Communication (NFC), or other, or through an optical communication protocol using infrared (IR) signals, or through an acoustic communication protocol using auditory signals or ultrasonic signals. In some implementations, for example, the wireless coded signal can be programmed to transmit from the unmanned vehicle only in certain conditions, such as upon a landing or arrival of the unmanned vehicle at a target destination, or upon receiving a command transmitted by the remote user's client device and processed by the unmanned vehicle's data processing unit to enable transmission of the wireless signal code.

Also, for example, in example embodiments of the coded unmanned vehicle using a physical, imageable code, such as a QR code, the physical, imageable code can be affixed on an outer surface of the unmanned vehicle's casing to allow for the remote user's client device to use an image capture device of the client device to scan the code and send the data from the scanned code to the centralized data management system via a globally connected and/or secured network. In some embodiments, the unmanned vehicle is equipped with both the scannable wireless signal code and the physical, imageable code, which in all example embodiments can provide the remote user with the ability to quickly scan/ obtain the code via a digital signal or common interface tool to provide a universal solution that is both easy to use and accessible to any nation or variety of languages for implementing confidential missions by the UVM system.

For example, the disclosed UVM systems and methods are envisioned to create distributed networks and cloud-based solutions to control unmanned vehicles that will be essential for the success of commercial drones in various emerging markets, which presently lack sufficient means and methods to operate across large populations and regions due to local population and regional challenges.

Example Embodiments

FIG. 1 shows a diagram of an example embodiment of an unmanned vehicle management system, labeled 100, in accordance with the present technology. The unmanned vehicle management system 100 (also referred to as system 100) includes a centralized data management system 150 (also referred to as data management system 150) in communication with a plurality of client devices 130 and one or more unmanned vehicle(s) 170. The devices of the centralized data management system 150 are in communication with the plurality of client devices 130 and the unmanned vehicle(s) 170 via a network 140.

In some embodiments, for example, the centralized data management system 150 can include one or more server computer devices 152, one or more databases 154, and/or one or more client computer devices 158, in data communication with each other (collectively referred to as "computing devices 152, 154, and/or 158"). In some implementations, for example, the computing devices 152, 154, and/or 158 can be configured to be in communication with each other through a closed or restricted network; whereas in some implementations, for example, at least some of the devices of the computing devices 152, 154, and/or 158 can be configured to be in communication with each other through a public network, such as the Internet. In some implementations, for example, the computing devices 152, 154, and/or 158 can be configured to be in communication with other external devices (not part of the system 100) via the network 140.

The client device 130 can be embodied as a personal computer (e.g., desktop computer or laptop computer) and/ or a mobile communication device 130A, including but not limited to a smartphone, a smart wearable (like a smartwatch, smart glasses, etc.), a personal digital assistant (PDA), etc.; or a network hub 130B (e.g., a wireless modem, a Wi-Fi router, etc.); or other. In some implementations, for example, the client device 130 is operable to transmit a wireless transmission carrying data indicative of the code acquired from (e.g., scanned, imaged, etc.) the unmanned vehicle 170 to the centralized data management system 150. In some implementations, for example, each client device 130 of the plurality can be associated with a particular user or group of users, which are located in different locations with respect to each other. In some implementations, for example, the client device 130 can process, at least partially, the received data from the centralized data management system 150 for display on a display screen of the client device 130 and/or for transfer of the received data to an external device, such as the unmanned vehicle 170. In some embodiments of the system 100, for example, at least some of the client device(s) 130 and/or the computing devices 152, 154, and/or 158 can include a software application ("app") that is resident on the respective device to control various data processing, storage, and communication functionalities for management of the received data.

The unmanned vehicle 170 can include any of an aerial drone, land drone, and marine drone operable to travel by its designed drive or propulsion systems based on navigation technology that can be programmable and fully- or semi-autonomous. The unmanned vehicle 170 includes a housing or casing 171. The unmanned vehicles include a code 175 that allows for the client device(s) 130 to scan or otherwise receive and subsequently process on the client device(s) 130 or send the code 175 to the centralized data management system 150 via a globally connected and/or secured network (e.g., network 140 discussed below) to manage the unmanned vehicle's 170 task or mission plan (e.g., destination, departure, arrival, etc.) and/or usage (e.g., payload carry, payload distribution, pricing, etc.). In some embodiments, the code 175 can include a physical, imageable code displayable on the unmanned vehicle 170; whereas in some embodiments, the code 175 can include a wireless signal code that is transmitted and scannable/receivable by a wireless receiver unit of the client device(s) 130; and in some embodiments, the code 175 can include both the physical, imageable code and the wireless signal code.

In some embodiments of the unmanned vehicle 170, a physical, imageable code 175 can be affixed to a portion of the housing 171, which can be on an outward-facing surface or an inward facing surface that is accessible for accessing the content of the imageable code 175. In some embodiments, for example, the imageable code 175 is included on another component of the unmanned vehicle other than the housing 171. For example, in some embodiments, the imageable code 175 can include a QR code, a text-based code, or a graphic-based code, or other imageable code format, or combination thereof.

In some embodiments of the unmanned vehicle 170, a wireless signal code 175 can be (i) a wireless communication protocol comprising Bluetooth®, Bluetooth® Low Energy (BLE), ZigBee, or Near Field Communication (NFC); (ii) an optical communication medium using infrared (IR) signals; (iii) an acoustic communication medium using auditory signals or ultrasonic signals; or other coded wireless signal or combination thereof.

In some embodiments, the housing 171 encases and/or attaches an electronics unit 172 of the unmanned vehicle 170 that includes a communications unit and a location tracking unit 172, e.g., such as a Global Positioning System (GPS), cellular communication device for cellular triangulation tracking, or other. In some embodiments, for example, the electronics unit 172 includes a data processing unit (comprising a processor, memory, and input/output interface) that is in data communication with the location tracking unit and the communication unit. In some embodiments, for example, the communication unit includes one or both of a wireless communication unit (e.g., wireless transceiver) and/or a wired connection interface.

In some embodiments of the unmanned vehicle 170, for example, the imageable code 175 includes a displayable QR code that can be scanned and/or imaged by an image capture device, such as a camera, scanner, etc., of the client device 130. In some embodiments, for example, the imageable code 175 can include another type of visually-encoded article displaying a code comprising text (of an existing or non-existing language), graphic designs, color, brail, or any two-dimensional or three-dimensional displayable representation.

Figure 2:
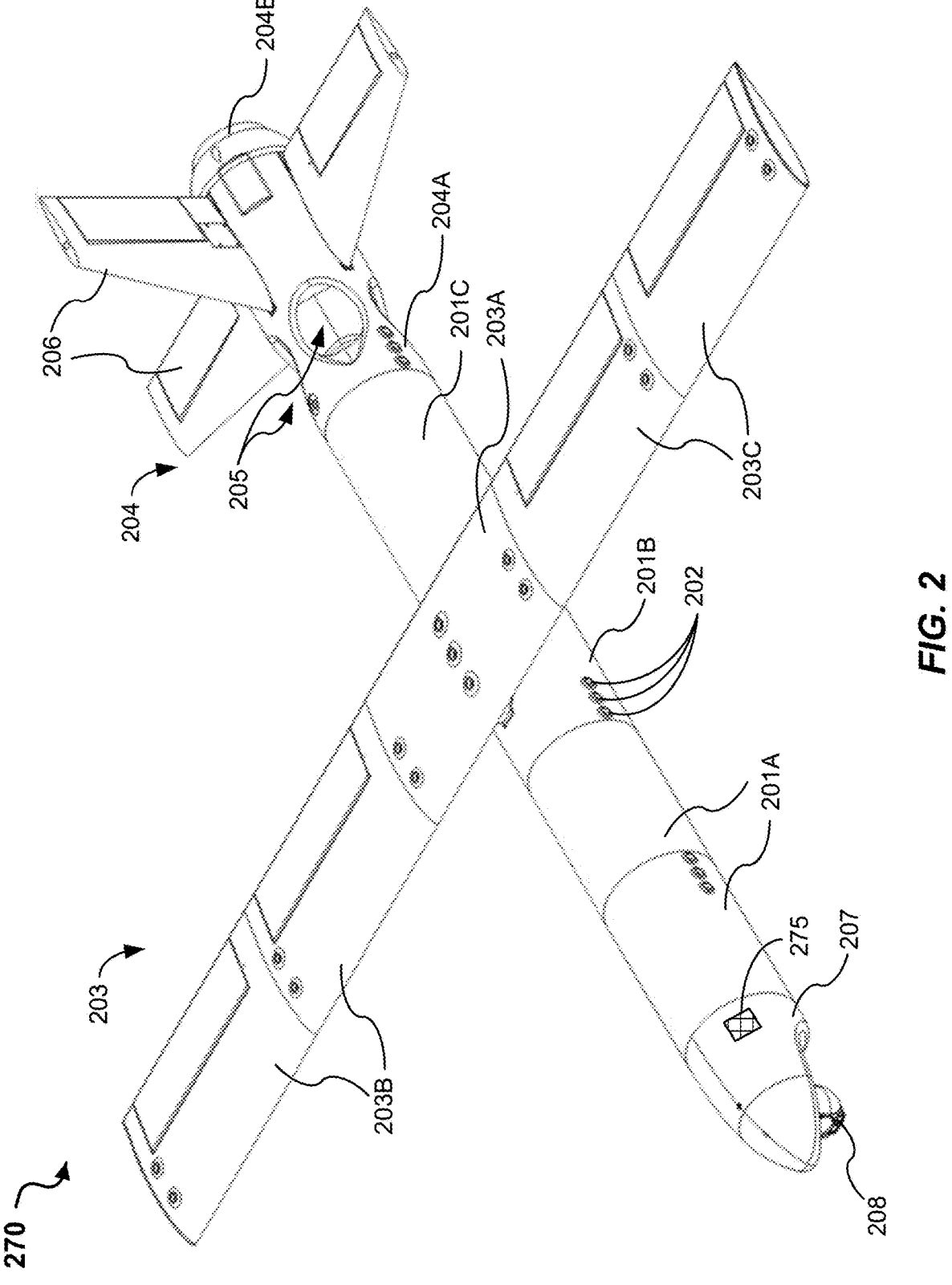
FIG. 2 shows a diagram illustrating an example embodiment of an unmanned vehicle in accordance with the present technology.

FIG. 2 shows a diagram illustrating an example embodiment of an unmanned vehicle 170 configured as an unmanned aerial vehicle 270. The unmanned aerial vehicle 270 includes at least one fuselage section 201, at least one wing assembly 203, a nose cone section 207, and a tail assembly 204, which are individually manufacturable and able to be assembled for mission-adaptable applications. Examples of mission-adaptable aerial vehicles, such as the example unmanned aerial vehicle 270, are disclosed in U.S. Patent Publication No. 2024/0092510A1, which is incorporated by references herein for all purposes.

In various embodiments of the example unmanned aerial vehicle 270, the nose cone 207 can be configured in a variety of geometries and include various modules, such as an imaging module (comprising one or more cameras that are in communication with the electronics unit 172 (not shown)); a sensor module (which can include one or more sensors including but not limited to a motion sensor, a pressure sensor, a temperature sensor, or other sensor (not shown), which can be in communication with the electronics unit 172); and/or other modules or payloads to be carried by the unmanned aerial vehicle 270. In the example of FIG. 2, the nose cone section 207 includes a camera mount structure 208 (e.g., a gimble) to mount one or more cameras and/or one or more sensors to the lower region of the nose cone and allow for full 360° or at least 300° rotation in each of the three cartesian planes.

In various embodiments of the example unmanned aerial vehicle 270, the at least one fuselage section 201 can be configured in a variety of geometries and include an at least partially hollowed interior usable for a various purposes, such as stabilize the unmanned aerial vehicle 210 for flight, as well as store components of the electronics unit 172 and/or a power/propulsion unit, payload(s), supplies, or other articles. In various embodiments of the example unmanned aerial vehicle 270, the wing assembly 203 can be designed as a single module or into multiple extension modules to adjust aspect ratio, loitering times, and ranges for flight of the unmanned aerial vehicle 270 and/or to carry various ranges of weight and/or volume for various mission parameters.

In some embodiments, like in the example shown in the diagram of FIG. 2, the at least one fuselage section 201 includes multiple fuselage sections: a front fuselage section 201A, a central fuselage section 201B coupled to the front fuselage section 201A, and a rear fuselage section 201C coupled to the central fuselage section 201B. Each of the fuselage sections 201A, 201B, and 201C may include one or more individual fuselage components. The nose cone section 207 is coupled to the front fuselage section 201A, and the tail assembly 204 is coupled to the rear fuselage section 201C. The wing assembly 203 is coupled to the central fuselage section 201B. The front fuselage section 201A and/or the rear fuselage section 201C can include additional sub-segments (like that shown in FIG. 2 for the front fuselage section 201A), e.g., to extend or reduce the length of the fuselage of the mission adaptable aerial vehicle 210 based on parameters of the mission.

In various embodiments of the example unmanned aerial vehicle 270, the tail assembly 204 includes a tail segment housing 204A and a tail end component 204B coupled to the tail segment housing 204A, which is coupled to the rear fuselage section 201C. The tail assembly 204 includes an inlet (e.g., inlet duct or inlet tube), which can be configured as a single inlet duct (not shown) or a multi-inlet duct 205 (e.g., exemplified in FIG. 2) configured in the tail segment housing 204A to direct air intake into the tail segment housing 204A. In some embodiments, for example, the unmanned aerial vehicle 270 is configured to have a powerplant (e.g., engine) disposed in the tail segment housing 204A; and the tail end component 204B includes one or more outlets to allow exhaust to flow outward and provide thrust for flight of the unmanned aerial vehicle 270. In some embodiments, for example, the tail assembly 204 includes one or more tail wings 206 coupled to the tail segment housing 204A. For example, as depicted in the diagram of FIG. 2, the tail assembly 204 includes a vertical stabilizer for the example vertical tail wing of the one or more tail wings 206, which can control yaw; in some embodiments, the vertical tail wing can include a rudder to affect yaw (side-to-side) and/or one or more trim tabs. Also, for example, as depicted in the diagram of FIG. 2, the tail assembly 204 includes two horizontal stabilizers for the two example horizontal tail wings of the one or more tail wings 206, which can include an elevator to affect pitch (up-down) and/or one or more trim tabs.

In some embodiments, like in the example shown in the diagram of FIG. 2, the wing assembly 203 includes multiple wing sections: a right-side wing section 203B, a central wing section 203A coupled to the right-side wing section 203B, and a left-side wing section 203C coupled to the central wing section 203A. The central wing section 203A is coupled to the central fuselage section 201B. The left-side wing section 203C and the right-side wing section 203B each can include additional sub-segments for the wing assembly (like that shown in the example FIG. 2), e.g., to extend or reduce the wingspan of the unmanned aerial vehicle 270 based on parameters of the mission. For example, as depicted in the diagram of FIG. 2, the wing assembly 203 can include one or more flaps (e.g., to affect lift and drag during flight), one or more ailerons (e.g., to affect roll), one or more spoilers (e.g., to affect lift and drag), and/or one or more slats (e.g., to affect lift).

As shown in FIG. 2, the unmanned aerial vehicle 270 includes a physical, imageable code 275 (e.g., a displayable QR code) that can be scanned and/or imaged by an image capture device, such as a camera, scanner, etc., of the client device 130. In some embodiments, for example, the imageable code 275 can include another type of visually-encoded article displaying a code comprising text (of an existing or non-existing language), graphic designs, color, brail, or any two-dimensional or three-dimensional displayable representation. In the example shown in FIG. 2, the imageable code 275 is disposed on an outer surface of a section of the unmanned aerial vehicle 270 (e.g., on the nose cone section 207 in this example). It is understood that the imageable code 275 may be disposed on other sections of the unmanned aerial vehicle 270; and it is understood that the imageable code 275 may be disposed on an interior surface of the unmanned aerial vehicle 270, e.g., which can be accessed via an access port to the interior surface or partial disassembly of the aerial vehicle or other means. In some embodiments, the imageable code 275 can be disposed in multiple locations of the unmanned aerial vehicle 270.

Referring back to FIG. 1, in some embodiments, for example, the code 175 can include a non-visual representation of the encoded subject matter, such as an auditory code, a non-visible light optical code, or other. For example, in some embodiments the code 175 can be provided by a wireless signal transmitting unit (not shown) of the electronics unit 172 configured as a wireless signal code. For example, in some embodiments, the exemplary wireless signal code 175 can be operated via control instructions from a data processing unit of the electronics unit 172 (not shown in FIG. 1), which can utilize software (e.g., programmed in an operating system (OS) or application (app) stored in memory of and executed by a processor of the data processing unit) to produce (e.g., transmit) the wireless code signal continuously, periodically, aperiodically, or under predetermined conditions. For example, a predetermined condition for the data processing unit to provide a command to the wireless transmitter unit of the unmanned vehicle 170 to transmit the wireless code signal can include, but is not limited to, a location of the unmanned vehicle 170 (e.g., determinable by the data processing unit processing GPS data); an altitude or depth of the unmanned vehicle 170 (e.g., determinable by the data processing unit by processing data from one or more altitude sensors and/or pressure sensors); a rate of the unmanned vehicle 170 (e.g., determinable by the data processing unit processing rate data from a rate sensor); an orientation of the unmanned vehicle (e.g., determinable by the data processing unit processing orientation data from a tilt sensor, accelerometer, etc.); or other condition or combination thereof. As an illustrative example, the exemplary wireless signal code can be configured to be transmitted only when the unmanned vehicle is operating a rate of zero (i.e., stationary). Whereas, in some embodiments, the data processing unit can be configured to only command to the wireless transmitter unit of the unmanned vehicle 170 to transmit the wireless code signal when the data processing unit has received an input signal from the client device 170 to initiate the transmission of the wireless code signal. In this manner, an extra layer of security can be added by requiring an initiation signal from the client device

170 at a travel node of the unmanned vehicle 170 to initiate the unmanned vehicle 170 to transmit the wireless signal code, of which the client device 170 can then obtain and process and/or send to the centralized data management system 150.

In some embodiments of the system 100, the unmanned vehicle 170 and the client devices 130 are in communication with the centralized data management system 150 via a network 140 of computers in communication with each other and accessible through wired and/or wireless communication connections. In some embodiments, for example, the network 140 is a public network, such as the Internet (e.g., where the network of computers in communication with each other is also referred to as the "cloud"). In some embodiments, for example, the network 140 is a private network, where the computers in communication with each other are highly secure and restricted from use by unauthorized users and devices, e.g., such as a military network, like the Advanced Research Projects Agency Network (ARPANET) or portions thereof like the MILNET. In some embodiments of the system 100, for example, the network 140 can include a satellite network. Information from the unmanned vehicle 170 and/or the client devices 130 is transferred to centralized data management system 150 via data transmissions, which can be wireless and/or wired data communications. Similarly, information from the centralized data management system 150 is transferred to the client devices 130 and/or the unmanned vehicle 170 via data transmissions, which can be wireless and/or wired data communications.

In some implementations, for example, the centralized data management system 150 can remotely store and process data associated with a mission of the unmanned vehicle(s) 170, including individual, unrelated unmanned vehicles or a fleet of related unmanned vehicles, where the mission includes a movement or travel plan of the unmanned vehicle, a payload management plan for payload carried or stored by the unmanned vehicle, or other use plan for the unmanned vehicle or its cargo. The data associated with the mission is centrally managed by the centralized data management system 150 but processed to be distributed in different portions or versions that are separably accessible on the particular client device 130 that the different portion or version is transferred to.

For example, a centrally controlled and modifiable code database and network-based (online) access can be used in commercial or governmental applications. In some implementations, for example, the centralized data management system 150 can distribute one or more tokens (e.g., which may be purchased by) to index and/or control access to the segmented information associated with a mission to be implemented by the unmanned vehicle 170 via interaction with the multiple client devices 130 at the different locations of the mission. For example, the token(s) can be created to associate with a particular data segment that is associated with a particular aspect of the mission, i.e., the multiple and different locations and tasks to be performed at a given location, e.g., or any number of variables such as distance, payload, gross take-off weight, flight time, etc. In various implementations, for example, the code 175 of the unmanned vehicle(s) 170 can remain unique and only integrated through approved commercial or governmental applications and networks.

Figure 3:
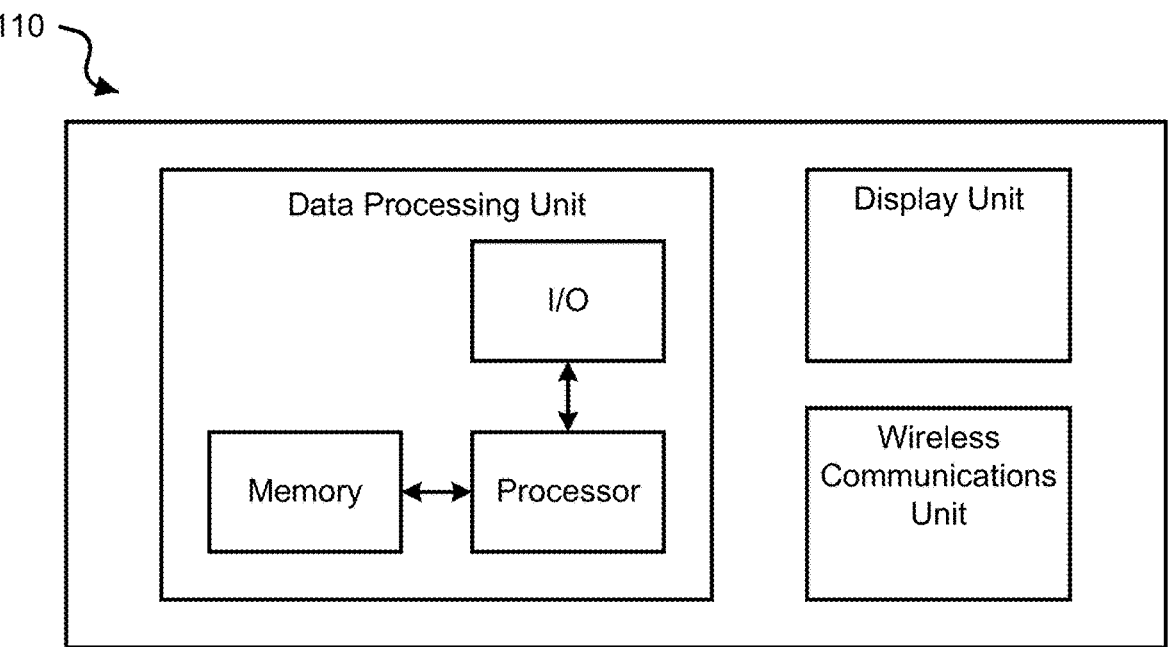
FIG. 3 shows a block diagram of an example embodiment of the data processing device in accordance with the present technology.

FIG. 3 shows a block diagram of an example embodiment of a data processing device 110 of the semi-autonomous unmanned vehicle managing system 100. The data processing device 110 may be embodied by a computer or computing device of the centralized data management system 150, the client device 130, and/or the unmanned vehicle 170.

The data processing device 110 includes one or more processor(s) to process data, one or more memory unit(s) in communication with the processor(s) to store data, and an input/output unit (I/O) to interface the processor(s) and/or memory unit(s) to other modules, units or devices of the data processing device 110 or external devices. For example, the processor(s) can include a central processing unit (CPU) or a microcontroller unit (MCU). For example, the memory unit(s) can include and store processor-executable code, which when executed by the processor(s), configures the data processing unit to perform various operations, e.g., such as receiving information, commands, and/or data, processing information and data, and transmitting or providing information/data to another device. In some implementations, the data processing unit can transmit raw or processed data to a computer system or communication network accessible via the Internet ('the cloud') that includes one or more remote computational processing devices (e.g., servers in the cloud). To support various functions of the data processing unit, the memory unit(s) can store information and data, such as instructions, software, values, images, and other data processed or referenced by the processor(s). For example, various types of Random Access Memory (RAM) devices, Read Only Memory (ROM) devices, Flash Memory devices, and other suitable storage media can be used to implement storage functions of the memory unit(s).

In some embodiments, the data processing device 110 can optionally include a wireless communication unit. For example, in some implementations, the I/O of the data processing unit can interface the data processing unit with the wireless communications unit to utilize various types of wired or wireless interfaces compatible with typical data communication standards, for example, which can be used in communications of the data processing unit with other devices, via a wireless transmitter/receiver (Tx/Rx) unit, e.g., including, but not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, NFC (Near Field Communication), and parallel interfaces.

The I/O of the data processing unit can also interface with other external interfaces, sources of data storage, and/or visual or audio display devices, etc. to retrieve and transfer data and information that can be processed by the processor(s), stored in the memory unit(s), or exhibited on an output unit of the data processing device 110 or an external device. For example, in some embodiments, the data processing device 110 can optionally include a display unit configured to be in data communication with the data processing unit, e.g., via the I/O, to provide a visual display, an audio display, and/or other sensory display that produces a user interface of a software application in accordance with the semi-autonomous unmanned vehicle managing system 100. In some examples, the display unit can include various types of screen displays, speakers, or printing interfaces, e.g., including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

Figure 4:
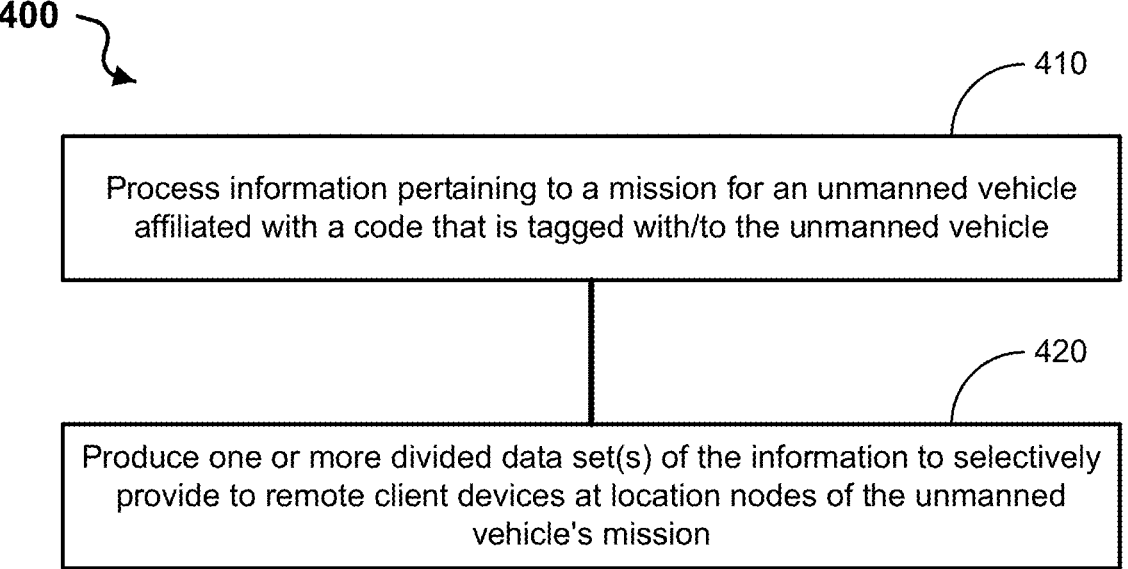
FIG. 4 shows a diagram of an example embodiment of a method for mission management of unmanned vehicle(s), in accordance with the present technology.

FIG. 4 shows a diagram of an example embodiment of a method for mission management of unmanned vehicle(s) 400, in accordance with the present technology, which can be implemented by example embodiments of the semi-autonomous unmanned vehicle managing system 100. The method 400 includes a process 410 to process information pertaining to a mission for an unmanned vehicle (e.g., embodiments of the unmanned vehicle 170) affiliated with a code (e.g., code 175, such as a wireless signal code and/or a physical imageable code) that is tagged with/to the unmanned vehicle. The method 400 includes a process 420 to produce one or more divided data set(s) of the information to selectively provide to remote client devices at location nodes of the unmanned vehicle's mission. For example, the divided data set(s) can be configured to direct (i) particular task(s) to be performed by users of the remote client devices on the unmanned vehicle when located at a particular location node of the mission and/or (ii) particular configuration(s) of the unmanned vehicle to program the unmanned vehicle to operate in a particular manner for a next portion of the mission. In implementations of the process 420, the produced divided data set(s) are selectively assigned to particular client devices and the particular location node of the mission, such that other client devices do not receive and remain obfuscated from other data set(s) of the divided data set(s) that such other client devices were not selected for. In this manner, the method obfuscates the mission from certain client devices and remote users, which can restrict portions of the mission, e.g., certain data set(s) of the divided data set(s), from such client devices and remote users.

FIG. 5 shows a diagram of an example embodiment of a method for confidential mission management of unmanned vehicle(s), labeled method 500, in accordance with the method 400, which can be implemented by example embodiments of the semi-autonomous unmanned vehicle managing system 100. The method 500 includes a process 510 to generate or receive a code (e.g., code 175) associated with an unmanned vehicle (e.g., embodiments of the unmanned vehicle 170) and associated with information pertaining to a mission of the unmanned vehicle. For example, the code is configured in at least one of a physical format or a wireless signal format that is emanating from and/or coupled to the unmanned vehicle. In some implementations, for example, the process 510 is implemented by the centralized data management system 150.

The method 500 includes a process 520 to data process the information pertaining to the mission into a plurality of data sets, where each data set is associated with a portion of the mission and/or with a configuration of the unmanned vehicle corresponding to the portion of the mission. For example, the configuration of the unmanned vehicle corresponding to the portion of the mission can include, but is not limited to, a maintenance protocol (e.g., refueling, recharging, structural modification, etc. of the unmanned vehicle) to be performed on the unmanned vehicle, a payload management protocol (e.g., loading, unloading, enabling, etc. of a payload for the unmanned vehicle), and/or a digital command set (e.g., flight/drive plan, propulsion plan, navigation plan, etc.) to be received, stored, and processed by a data processing unit of the unmanned vehicle, for segmented portions of the mission. In some implementations, for example, the process 520 is implemented by the centralized data management system 150.

The method 500 includes a process 530 to receive a first input data including the code that is provided by a client device located at a location node of the mission, wherein the code was obtained by the client device by acquisition of the code from the unmanned vehicle at the location node. For example, in implementations of the process 530, the client device is able to scan the code (e.g., image the physical code or wirelessly receive the wireless signal code) from the unmanned vehicle at the location node site when the unmanned vehicle has arrived at the site, and the client device may then transmit the code in the first input data to the data management system to be received by the data management system for subsequent processing. In some implementations, for example, the process 530 is implemented by the centralized data management system 150.

The method 500 includes a process 540 to determine a first set of operation instructions (by processing the first input data) to be implemented by the unmanned vehicle or by the first remote user to affect the unmanned vehicle. In some implementations of the process 540, for example, the first set of operation instructions include at least one of a first maintenance task for the unmanned vehicle, a first refueling task of the unmanned vehicle, a first payload loading, payload unloading, or payload modification task for the unmanned vehicle, or a digital command set (e.g., flight/drive plan, propulsion plan, navigation plan, etc.) for the unmanned vehicle (e.g., to be processed by a data processing unit of the unmanned vehicle to control execution of the command set by the unmanned vehicle). In some implementations, for example, the process 540 is implemented by the centralized data management system 150.

The method 500 includes a process 550 to provide (e.g., transmit) the first set of operation instructions to the first client device and/or the unmanned vehicle, e.g., via a network (e.g., the network 140). In some implementations, for example, the process 550 is implemented by the centralized data management system 150.

Example Applications

In some example scenarios for implementing various example embodiments of the disclosed unmanned vehicle management system and method, a party (e.g., individual(s) or organization(s)) can initiate the launch and landing of an aerial drone between locations (e.g., which can include one or more regional hubs, including obscure locations in remote parts of the world) with a flight path programed by the initial party or the centralized data management system that is only known to the initial party and the centralized data management system for the aerial drone to be received at a subsequent location to be managed by another intended party (known to the centralized data management system, but not necessarily known to the initial party or any other party). The other party could be tasked with a maintenance protocol (e.g., refueling, recharging, etc.) or a payload management protocol (e.g., loading, unloading, enabling, etc.) per unique instructions provided by the centralized data management system to the other party's client device while at the subsequent location, e.g., a "pit-stop" location. For example, upon receipt at the "pit-stop" location, the other party can take control of the aerial drone via a received wireless code signal transmitted from the aerial drone or a QR code scan of the code physically displayed on a part of the aerial drone and after verification that the other party is the intended party for control. In some embodiments for the example scenario, the verification of the party(ies) may be managed via a token (e.g., a purchased token in a commercial application, or a highly-securitized token for use on a private network distributed to the party). Upon verification, the other party is able to receive user instructions which can be displayed to the user of the client device to perform manual labor tasks (e.g., maintenance or payload operations) and/or device instructions that may be transferred to a data processing device of the aerial drone to autonomously or semi-autonomously load a new mission (e.g., flight plan) which may or may not be known to the user of the client device of the other party (or any party in the chain of parties). As such, the initial location (original launch site) and/or future locations is/are effectively partitioned from the parties at those sites, creating secrecy, anonymity, and/or obfuscation.

While this exemplary application benefits range extension of the unmanned vehicle (e.g., through control of fueling points and/or maintenance), the unmanned vehicle management system and method can also control the repurposing of the mission of the unmanned vehicle, e.g., changing the configuration of the unmanned vehicle platform and mission controls to perform completely different operational activities from its origin. Moreover, such mission repurposing management of unmanned vehicles can be implemented in real time, e.g., such as after a first launch of the unmanned vehicle for a mission but before completion of the mission such as at an intermediary node of the mission.

Regionally distributed "pit-stops" for aerial drone travels can include a road, an airfield, an airstrip, or suitable areas that have been previously identified as having access to applicable landing/takeoff conditions. In some implementations, for example, regionally distributed "pit-stops" may require sufficient resources, such as fuel, charging source, payload(s), and/or network access. Also, for example, validated and expeditionary locations can be integrated into a regional access mapping data set (e.g., database file or files, data structure or structures, etc.) that is stored and provided by the disclosed unmanned vehicle management system and method, which provide a client device with risk assessment information for the travel plan of the unmanned vehicle (e.g., take-off and landing of an aerial drone). In some implementations, for example, the centralized data management system can coordinate users of the client devices in the same or different locations by providing training and online tutorials (e.g., provided to the client devices previously or in real-time and/or on-demand), such as text-based content, audio-based content, video-based content, or augmented reality (AR)-based technology content, in order to assist the "pit-stop" attendant(s) in accomplishing specific tasks.

In some examples, the tooling and/or re-purposing of an unmanned vehicle (e.g., such as an aerial drone, marine drone, or land drone) is coordinated and controlled by the centralized data management system in a clandestine manner from the personnel operating the client devices in various locations to execute a mission of the unmanned vehicle while shielding the personnel from details of the mission. As a result of these capabilities enabled by the disclosed data management system architecture, traditional hierarchical human-organized and controlled operations involving sensitive materials where secrecy and separation is paramount-like in a military application—can be implemented by a commercial service (e.g., loading, unloading and/or deployment of a sensitive payload for transport by the unmanned vehicle). For example, by using a separated and/or obfuscated launch, route, recovery, refuel, re-task approach in accordance with the disclosed methods, a point of origin from the unmanned vehicle and/or payload is protected from intermediary users and end user actions, and thereby the range of travel of the unmanned vehicle can be extended (e.g., virtually of an unbounded magnitude), including across borders, terrain, and oceans of any kind. For example, in scenarios where the unmanned vehicle is an aerial drone with integrated vertical take-off and landing (VTOL), the "pit-stops" can utilize very small landing zones, boats, ships, and afloat staging areas to penetrate regions inaccessible from current unmanned aerial vehicle control and legacy systems. For instance, providing an established infrastructure to support regional operations and functions allows many platforms (e.g., UAVs, UMVs, ULVs) that are limited by range to be able to reach remote regions typically requiring more costly solutions. The commercial applications for such range extension and support networks can grow and create new commercial activities for populations that are isolated by regional challenges. For example, having stations to load essential medical equipment, blood, and vaccines and reach isolated populations has the chance to enable an entirely new market of remote medical support and care. Additionally, drone delivery and movement can utilize developed networks for multi-use support in their commercial utilization, including a variety of unmanned aerial vehicle embodiments, including rotary wing and fixed wing systems.

Some example implementations of various example embodiments of the disclosed unmanned vehicle management system and method can be configured for distributed semi-autonomous platform projection and application management. For example, in some applications of the example embodiments and implementations of the disclosed technology, a QR code-enabled or wireless signal code-enabled fleet of semi-autonomous air-, ground-, and/or water-based vehicles (e.g., referred to herein as "platforms") can be launched and distributed throughout areas of interest and received by a dispersed and decentralized network of human operators for support (e.g., maintenance, refueling, rearming, payload modification, etc.) and/or re-tasking. In various examples, there is a complete obfuscation between operators for the launch and the receipt of platform. A unique QR code or wireless signal code (or codes) are on each platform to allow a globally connected commercial or militarily secured network to manage the fleet's dispersion, mission planning, and/or permissions for usage (for example, such as routes, targets, number of flights, pricing or other).

In some examples, individuals or organizations launch an airborne platform from regional hubs or obscure locations with a general flight path intended to be received by a refueling/re-tasking location. Upon receipt at the intermediary ("pit-stop") location, a new owner will take control of the platform via scan or reception of the QR code or wireless signal code, respectively, and with verification (e.g., via a purchased token (commercial) or distributed token (govt. distributed to a partner) for allowing the refueling/re-tasking, etc. operation(s), so that a newly-loaded mission and/or flight plan (which may or may not be known to the new owner) can be executed. Once received, the original launch site is partitioned from the new platform tasker, creating obfuscation.

Centrally controlled and modifiable wireless signal code or QR code database and online application access can be commercially available and/or secured through government-approved networking for Governmental usage. Tokens may be distributed or purchased depending on the variant and provide a monetization of individual flight or any number of variables such as distance, payload, gross take-off weight, flight time, etc. Also, for example, wireless signal codes or QR codes for government and/or non-government (commercial) platforms shall remain unique and only integrated through approved commercial or government applications and networks. As an example, a commercial long range delivery platform will not be able to convert to a kinetic/ weapons system or any other modification that violates compliance to a regulation. Onboard measures to prevent modification and nefarious use of commercial platforms are included on such platforms to ensure such compliance.

Regional distributed "pit-stops" can include a road, airfield, airstrip, or suitable previously identified areas that have access to applicable fuels, payloads and network access. Validated and expeditionary locations can be integrated into a regional access mapping solution which provides risk assessment for take-off and landing.

In an example use case for government utilization with a platform having a weapons system, arming and re-purposing the aircraft can be utilized with previously-coordinated training and online tutorials or the use of augmented reality (AR) technology to assist the "pit-stop" attendant in accomplishing specific tasks. For some weapons system-carrying platform, the pre-staging of qualified munitions and integration of battlefield expeditionary solutions (e.g., mortars, rockets, artillery, explosives, and other traditional lethal effects) through aircraft clamshell modification can be enabled by a commercial service based on the obfuscation scheme.

For example, using the obfuscated launch, route, recovery-refuel-re-task approach, the point of origin is protected from end user actions and can extend range by an infinite magnitude, even crossing borders and oceans. Furthermore, for platforms having an integrated vertical take-off and landing (VTOL) capability, the pit-stops can utilize very small landing zones, boats, ships, and afloat staging areas to penetrate regions inaccessible from current small unmanned aircraft system (sUAS) and legacy systems.

This technique of QR scanned launch, route, recovery-refuel-re-task and recovery can proliferate to additional commercial or governmental sUAS, unmanned aircraft system (UAS), and unmanned ground systems (UGS), e.g., based at least in part to the coding, control, and decentralized mission tasking. In some examples, through an open source or commercially available application, users can provide extended range delivery service of critical supplies or services to remote regions, even those without active runways and access to proprietary batteries and chargers. In some examples, through a secure military application networked through classified servers and cloud-based access, intelligence, surveillance, and reconnaissance (ISR) missions, kinetic precision guided strike, electronic warfare, and other sensitive missions can be planned and executed from anywhere in the world.

Implementations of the disclosed technology can enable the launch, route, recovery, refuel, retool, load-unload, and/or re-task of any type of unmanned vehicles for any type of mission by the disclosed technique of coding, centralized control, and decentralized mission tasking. For example, through the software application resident on the client device, for example, the intended user(s) can provide extended range delivery service of critical supplies and/or services to remote regions, even those without active runways and access to proprietary batteries and chargers. This can be implemented harnessing a public network (e.g., the Internet) or a private network (e.g., military network).

EXAMPLES

In some embodiments in accordance with the present technology (example A1), an unmanned vehicle management system includes a centralized data management system comprising one or more computing devices; and a plurality of client devices in communication with the centralized data management system; and one or more unmanned vehicles.

Example A2 includes the unmanned vehicle management system of any of examples A1-A12, wherein the centralized data management system is configured to store and process data associated with a mission of the one or more unmanned vehicles, where the mission includes a movement or travel plan of the one or more unmanned vehicles or a payload management plan for payload carried or stored by the one or more unmanned vehicles.

Example A3 includes the unmanned vehicle management system of example A2 or any of examples A1-A12, wherein the data associated with the mission is centrally managed by the centralized data management system but processed to be distributed in different portions or versions that are separably accessible on at least one particular client device of the plurality of client devices.

Example A4 includes the unmanned vehicle management system of any of examples A1-A12, wherein the centralized data management system includes one or more server computer devices and one or more databases, in data communication with each other.

Example A5 includes the unmanned vehicle management system of example A4 or any of examples A1-A12, wherein the centralized data management system further includes one or more client computer devices in data communication with at least one of the one or more server computer devices and/or the one or more databases.

Example A6 includes the unmanned vehicle management system of any of examples A1-A12, wherein the unmanned vehicle includes a code contained by or attached to a housing of the unmanned vehicle, wherein the code is operable to be acquired by a client device, which is usable to enable access to segmented data associated with a mission of the unmanned vehicle provided by the centralized data management system that is received and used by a particular client device.

Example A7 includes the unmanned vehicle management system of example A6 or any of examples A1-A12, wherein the unmanned vehicle includes an electronics unit comprising a wireless communications unit and a location tracking unit, wherein the wireless communications unit includes a wireless transceiver, and wherein the location tracking unit includes at least one of a Global Positioning System (GPS) for GPS tracking or a cellular communication device for cellular triangulation tracking.

Example A8 includes the unmanned vehicle management system of any of examples A1-A12, wherein the unmanned vehicle includes at least one of an aerial drone, a land drone, or a marine drone, the unmanned vehicle operable to travel by a drive or propulsion system using a navigation technology that is programmable by data associated with a mission that is stored and/or processed on the centralized data management system.

Example A9 includes the unmanned vehicle management system of example A8 or any of examples A1-A12, wherein the unmanned vehicle is fully-autonomous or semi-autonomous.

Example A10 includes the unmanned vehicle management system of any of examples A1-A12, wherein the one or more computing devices of the centralized data management system are in communication with the plurality of client devices and the one or more unmanned vehicles via a network.

Example A11 includes the unmanned vehicle management system of example A10 or any of examples A1-A12, wherein the network is a public network.

Example A12 includes the unmanned vehicle management system of example A10 or any of examples A1-A11, wherein the network is a private network.

In some embodiments in accordance with the present technology (example B1), an unmanned vehicle management system includes a centralized data management system comprising one or more computing devices; a client device comprising a data processor and in communication with the centralized data management system; and an unmanned vehicle comprising an electronics unit and having a code configured in a physical format or a wireless signal format that is operable to be acquired by the client device, wherein the code of the unmanned vehicle is usable to enable access to segmented data associated with a mission of the unmanned vehicle provided by the centralized data management system that is received and used by a particular client device, wherein the centralized data management system is configured to store and process data associated with the mission of the unmanned vehicle.

Example B2 includes the unmanned vehicle management system of any of examples B1-B14, wherein the mission includes a movement or travel plan of the unmanned vehicle or a payload management plan for payload carried or stored by the unmanned vehicle.

Example B3 includes the unmanned vehicle management system of example B2 or any of examples B1-B14, wherein the data associated with the mission is centrally managed and processed by the centralized data management system to be distributed in different portions or versions that are separably accessible on at least one particular client device of a plurality of client devices.

Example B4 includes the unmanned vehicle management system of any of examples B1-B14, wherein the one or more computing devices of the centralized data management system includes one or more server computer devices and one or more databases, in data communication with each other.

Example B5 includes the unmanned vehicle management system of example B4 or any of examples B1-B14, wherein the centralized data management system further includes one or more client computer devices in data communication with at least one of the one or more server computer devices and/or the one or more databases.

Example B6 includes the unmanned vehicle management system of any of examples B1-B14, wherein the code of the unmanned vehicle is in the wireless signal format and includes at least one of (i) a wireless communication protocol comprising Bluetooth®, Bluetooth® Low Energy (BLE), ZigBee, or Near Field Communication (NFC); (ii) an optical communication medium using infrared (IR) signals; or (iii) an acoustic communication medium using auditory signals or ultrasonic signals.

Example B7 includes the unmanned vehicle management system of any of examples B1-B14, wherein the code of the unmanned vehicle is in the physical format and contained by or attached to a housing of the unmanned vehicle.

Example B8 includes the unmanned vehicle management system of example B7 or any of examples B1-B14, wherein the code includes at least one of a QR code, a text-based code, or a graphic-based code.

Example B9 includes the unmanned vehicle management system of any of examples B1-B14, wherein the electronics unit comprises a wireless communications unit and a location tracking unit, wherein the wireless communications unit includes a wireless transceiver, and wherein the location tracking unit includes at least one of a Global Positioning System (GPS) for GPS tracking or a cellular communication device for cellular triangulation tracking.

Example B10 includes the unmanned vehicle management system of any of examples B1-B14, wherein the unmanned vehicle includes at least one of an aerial drone, a land drone, or a marine drone, the unmanned vehicle operable to travel by a drive or propulsion system using a navigation technology that is programmable by data associated with the mission that is stored and/or processed on the centralized data management system.

Example B11 includes the unmanned vehicle management system of example B10 or any of examples B1-B14, wherein the unmanned vehicle is fully-autonomous or semi-autonomous.

Example B12 includes the unmanned vehicle management system of any of examples B1-B14, wherein the one or more computing devices of the centralized data management system are in communication with at least one of the client device or the unmanned vehicle via a network.

Example B13 includes the unmanned vehicle management system of example B12 or any of examples B1-B14, wherein the network is a public network.

Example B14 includes the unmanned vehicle management system of example B12 or any of examples B1-B14, wherein the network is a private network.

In some embodiments in accordance with the present technology (example C1), a method for confidential mission management of an unmanned vehicle includes generating or receiving, at a data management system comprising one or more computing devices, a code associated with an unmanned vehicle and associated with information pertaining to a mission of the unmanned vehicle, wherein the code is configured in at least one of a physical format or a wireless signal format that is coupled to the unmanned vehicle; processing, at the data management system, the information pertaining to the mission into a plurality of data sets, where each data set is associated with a portion of the mission and a configuration of the unmanned vehicle corresponding to the portion of the mission; receiving, at the data management system, a first input data including the code from a first client device of a first remote user that is located at a first location node of the mission, wherein the code was obtained by the first client device by acquisition of the code from the unmanned vehicle at the first location node; processing, at the data management system, the first input data to determine a first set of operation instructions to be implemented by the unmanned vehicle or by the first remote user to affect the unmanned vehicle, wherein the first set of operation instructions include at least one of a first maintenance task for the unmanned vehicle, a first refueling task of the unmanned vehicle, or a first payload loading, payload unloading, or payload modification task for the unmanned vehicle, or a first digital command set including a travel plan, propulsion plan, or navigation plan for the unmanned vehicle; and transmitting, by the data management system, the first set of operation instructions to one or both of the first client device and the unmanned vehicle.

Example C2 includes the method of any of examples C1-C15, wherein the one or more computing devices of the data management system are in communication with a plurality of client devices that includes the first client device and in communication with the unmanned vehicle via a network.

Example C3 includes the method of example C2 or any of examples C1-C15, wherein the code is generated by the data management system and transmitted to the unmanned vehicle through the network to be configured in the wireless signal format that is stored in a data processing unit of the unmanned vehicle and transmittable by the unmanned vehicle to be received by an external client device.

Example C4 includes the method of example C2 or any of examples C1-C15, wherein the code is in the physical format and received by the data management system by an initial client device of the plurality of client devices that scanned or imaged the code and transmitted the code to the data management system.

Example C5 includes the method of any of examples C1-C15, further comprising receiving, from a remote client device and at the data management system, a mission data set comprising the information pertaining to the mission of the unmanned vehicle, wherein the remote client device is located at an initial location node of the mission where the unmanned vehicle is to initially embark on the mission.

Example C6 includes the method of any of examples C1-C15, further comprising receiving a second input data including the code at a second client device of a second remote user located at a second location node of the mission, wherein the code was obtained by the second client device by a scan of the code from the unmanned vehicle at the second location node; processing, at the data management system, the second input data to determine a second set of operation instructions to be implemented by the unmanned vehicle or by the second remote user to affect the unmanned vehicle, wherein the second set of operation instructions include at least one of a second maintenance task for the unmanned vehicle, a second refueling task of the unmanned vehicle, or a second payload loading, payload unloading, or payload modification task for the unmanned vehicle, or a second digital command set including a travel plan, propulsion plan, or navigation plan for the unmanned vehicle; and transmitting the second set of operation instructions to the second client device, wherein the second set of operation instructions and the first set of operation instructions are different and associated with different data segmentations of the information.

Example C7 includes the method of example C6 or any of examples C1-C15, wherein the plurality of data sets associated with the mission is centrally managed and processed by the data management system to be distributed in different portions or versions that are separably accessible on at least one particular client device of a plurality of client devices.

Example C8 includes the method of any of examples C1-C15, wherein the processing the information pertaining to the mission into the plurality of data sets includes producing two or more data subsets of the information each associated with portions of the mission, wherein the method comprises selecting, at the data management system, a particular client device located at a particular location node of the mission to provide a particular data subset of the two or more data subsets when the unmanned vehicle is at the particular location node and the data management system has received and processed input data with the code from the particular client device.

Example C9 includes the method of any of examples C1-C15, wherein the mission includes a movement or travel plan of the unmanned vehicle or a payload management plan for payload carried or stored by the unmanned vehicle.

Example C10 includes the method of any of examples C1-C15, wherein the code of the unmanned vehicle is in the wireless signal format and includes at least one of (i) a wireless communication protocol comprising Bluetooth®, Bluetooth® Low Energy (BLE), ZigBee, or Near Field Communication (NFC); (ii) an optical communication medium using infrared (IR) signals; or (iii) an acoustic communication medium using auditory signals or ultrasonic signals.

Example C11 includes the method of any of examples C1-C15, wherein the code of the unmanned vehicle is in the physical format and contained by or attached to a housing of the unmanned vehicle.

Example C12 includes the method of example C11 or any of examples C1-C15, wherein the code includes at least one of a QR code, a text-based code, or a graphic-based code.

Example C13 includes the method of any of examples C1-C15, further comprising providing, at the unmanned vehicle, the code associated with the unmanned vehicle to be linked to the unmanned vehicle.

Example C14 includes the method of any of examples C1-C15, further comprising prior to the processing the first input data, authenticating the first client device by the data management system.

Example C15 includes the method of any of examples C1-C14, wherein the unmanned vehicle includes at least one of an aerial drone, a land drone, or a marine drone, the unmanned vehicle operable to travel by a drive or propulsion system using a navigation technology that is programmable by at least one data segmentation of the plurality of data segmentations associated with the mission that is stored and/or processed on the data management system.

Example C16 includes the method of example C1 or any of examples C1-C14, wherein the method is implemented on the unmanned vehicle management system of any of examples A1-A12, the unmanned vehicle management system of any of examples B1-B14, or the unmanned vehicle management system of any of examples E1-E4 (below).

In some embodiments in accordance with the present technology (example D1), a system for confidential mission management of an unmanned vehicle includes an unmanned vehicle comprising an electronics unit and having a code configured in a physical format or a wireless signal format that is linked to the unmanned vehicle; and a data management system comprising one or more computing devices, the one or more computing devices comprising a process and a memory coupled to the processor and storing instructions that, when executed by the processor, cause the data management system to perform operations that comprise generating or receiving the code of the unmanned vehicle, wherein the code is associated with information pertaining to a mission of the unmanned vehicle, processing the information pertaining to the mission into a plurality of data sets, where each data set is associated with a portion of the mission and a configuration of the unmanned vehicle corresponding to the portion of the mission, receiving a first input data including the code from a first client device of a first remote user that is located at a first location node of the mission, wherein the code was obtained by the first client device by the first client device acquiring the code from the unmanned vehicle at the first location node, processing the first input data to determine a first set of operation instructions to be implemented by the unmanned vehicle or by the first remote user at the first location node to affect the unmanned vehicle, wherein the first set of operation instructions include at least one of a first maintenance task for the unmanned vehicle, a first refueling task of the unmanned vehicle, or a first payload loading, payload unloading, or payload modification task for the unmanned vehicle, or a first digital command set including a travel plan, propulsion plan, or navigation plan for the unmanned vehicle, and transmitting the first set of operation instructions to one or both of the first client device and the unmanned vehicle.

Example D2 includes the method of example D1, wherein the method includes at least one feature (e.g., structural feature or process feature) of the method of any of examples C1-C15.

Example D3 includes the method of example D1, wherein the method is implemented on the unmanned vehicle management system of any of examples A1-A12, the unmanned vehicle management system of any of examples B1-B14, or the unmanned vehicle management system of any of examples E1-E4 (below).

In some embodiments in accordance with the present technology (example E1), an unmanned vehicle management system includes a centralized data management system comprising one or more computing devices; a software application resident and operable on a client device, which comprises a data processor and a memory, and is in communication with the centralized data management system, which the software application is operable on a plurality of the client devices; and an unmanned vehicle comprising an electronics unit and having a code configured in a physical format or a wireless signal format that is operable to be acquired by the client device, wherein the code of the unmanned vehicle is configured to enable access to segmented data associated with a mission of the unmanned vehicle provided by the centralized data management system to a particular client device at a particular location node of the mission, wherein the centralized data management system is configured to store and process data associated with the mission of the unmanned vehicle.

Example E2 includes the unmanned vehicle management system of example E1 or includes the unmanned vehicle management system of any of examples A1-A12 or includes the unmanned vehicle management system of any of examples B1-B14, wherein the data associated with the mission is centrally managed and processed by the centralized data management system to be distributed in different portions or versions that are separably accessible on at least one particular client device of a plurality of client devices.

Example E3 includes the unmanned vehicle management system of example D1 or includes the unmanned vehicle management system of any of examples A1-A12 or includes the unmanned vehicle management system of any of examples B1-B14, wherein the code of the unmanned vehicle is in the wireless signal format and includes at least one of (i) a wireless communication protocol comprising Bluetooth®, Bluetooth® Low Energy (BLE), ZigBee, or Near Field Communication (NFC); (ii) an optical communication medium using infrared (IR) signals; or (iii) an acoustic communication medium using auditory signals or ultrasonic signals.

Example E4 includes the unmanned vehicle management system of example E1 or includes the unmanned vehicle management system of any of examples A1-A12 or includes the unmanned vehicle management system of any of examples B1-B14, wherein the code of the unmanned vehicle is in the physical format and contained by or attached to a housing of the unmanned vehicle, wherein the code includes at least one of a QR code, a text-based code, or a graphic-based code.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for confidential mission management of an unmanned vehicle, comprising:

generating or receiving, at a data management system comprising one or more computing devices, a code associated with an unmanned vehicle and associated with information pertaining to a mission of the unmanned vehicle, wherein the code is configured in at least one of a physical format or a wireless signal format that is coupled to the unmanned vehicle;

processing, at the data management system, the information pertaining to the mission into a plurality of data sets, where each data set is associated with a portion of the mission and a configuration of the unmanned vehicle corresponding to the portion of the mission;

receiving, at the data management system, a first input data including the code from a first client device of a first remote user that is located at a first location node of the mission, wherein the code was obtained by the first client device by acquisition of the code from the unmanned vehicle at the first location node;

processing, at the data management system, the first input data to determine a first set of operation instructions to be implemented by the first remote user to affect the unmanned vehicle, wherein the first set of operation instructions includes at least one of a first maintenance task for the unmanned vehicle, a first refueling task of the unmanned vehicle, or a first payload loading, payload unloading, or payload modification task for the unmanned vehicle;

transmitting, by the data management system, the first set of operation instructions to the first client device;

processing, at the data management system, the first input data to determine a first set of flight instructions to be implemented by the unmanned vehicle to affect a flight plan of the unmanned vehicle after the first location node, wherein the first set of flight instructions includes at least one of a travel plan, a propulsion plan, or a navigation plan for the unmanned vehicle;

transmitting, by the data management system, the first set of flight instructions to the unmanned vehicle;

receiving a second input data including the code at a second client device of a second remote user located at a second location node of the mission, wherein the code was obtained by the second client device by a scan of the code from the unmanned vehicle at the second location node;

processing, at the data management system, the second input data to determine a second set of operation instructions to be implemented by the unmanned vehicle or by the second remote user to affect the unmanned vehicle, wherein the second set of operation instructions include at least one of a second maintenance task for the unmanned vehicle, a second refueling task of the unmanned vehicle, or a second payload loading, payload unloading, or payload modification task for the unmanned vehicle; and transmitting the second set of operation instructions to the second client device, wherein the second set of operation instructions and the first set of operation instructions are different and associated with different data segmentations of the information.

2. The method of claim 1, wherein the one or more computing devices of the data management system are in communication with a plurality of client devices that includes the first client device and in communication with the unmanned vehicle via a network.

3. The method of claim 2, wherein the code is generated by the data management system and transmitted to the unmanned vehicle through the network to be configured in the wireless signal format that is stored in a data processing unit of the unmanned vehicle and transmittable by the unmanned vehicle to be received by an external client device.

4. The method of claim 2, wherein the code is in the physical format and received by the data management system by an initial client device of the plurality of client devices that scanned or imaged the code and transmitted the code to the data management system.

5. The method of claim 1, further comprising:

receiving, from a remote client device and at the data management system, a mission data set comprising the information pertaining to the mission of the unmanned vehicle, wherein the remote client device is located at an initial location node of the mission where the unmanned vehicle is to initially embark on the mission.

6. The method of claim 1, wherein the plurality of data sets associated with the mission is centrally managed and processed by the data management system to be distributed in different portions or versions that are separably accessible on at least one particular client device of a plurality of client devices.

7. The method of claim 1, wherein the processing the information pertaining to the mission into the plurality of data sets includes producing two or more data subsets of the information each associated with portions of the mission, wherein the method comprises selecting, at the data management system, a particular client device located at a particular location node of the mission to provide a particular data subset of the two or more data subsets when the unmanned vehicle is at the particular location node and the data management system has received and processed input data with the code from the particular client device.

8. The method of claim 1, wherein the mission includes a movement or travel plan of the unmanned vehicle or a payload management plan for payload carried or stored by the unmanned vehicle.

9. The method of claim 1, wherein the code of the unmanned vehicle is in the wireless signal format and includes at least one of (i) a wireless communication protocol comprising Bluetooth®, Bluetooth® Low Energy (BLE), ZigBee, or Near Field Communication (NFC); (ii) an optical communication medium using infrared (IR) signals; or (iii) an acoustic communication medium using auditory signals or ultrasonic signals.

10. The method of claim 1, wherein the code of the unmanned vehicle is in the physical format and contained by or attached to a housing of the unmanned vehicle.

11. The method of claim 10, wherein the code includes at least one of a QR code, a text-based code, or a graphic-based code.

12. The method of claim 1, further comprising:

providing, at the unmanned vehicle, the code associated with the unmanned vehicle to be linked to the unmanned vehicle.

13. The method of claim 1, further comprising:

prior to the processing the first input data, authenticating the first client device by the data management system.

14. The method of claim 1, wherein the unmanned vehicle includes at least one of an aerial drone, a land drone, or a marine drone, the unmanned vehicle operable to travel by a drive or propulsion system using a navigation technology that is programmable by at least one data segmentation of a plurality of data segmentations associated with the mission that is stored and/or processed on the data management system.

15. An unmanned vehicle management system, comprising:

a centralized data management system comprising one or more computing devices;

a plurality of client devices each comprising a data processor and in communication with the centralized data management system; and an unmanned vehicle comprising an electronics unit and having a code configured in a physical format or a wireless signal format that is operable to be acquired by the client device, wherein the code of the unmanned vehicle is configured to enable access to segmented data associated with a mission of the unmanned vehicle provided by the centralized data management system to a particular client device at a particular location node of the mission, wherein the segmented data includes two or more sets of operation instructions to be implemented when the unmanned vehicle is located at two or more location nodes, respectively, wherein the two or more sets of operation instructions comprise:

at first set of operation instructions, associated with a first location node, including at least one of a first maintenance task for the unmanned vehicle, a first refueling task of the unmanned vehicle, or a first payload loading, payload unloading, or payload modification task for the unmanned vehicle, and at second set of operation instructions, associated with a second location node, including at least one of a second maintenance task for the unmanned vehicle, a second refueling task of the unmanned vehicle, or a second payload loading, payload unloading, or payload modification task for the unmanned vehicle, wherein the centralized data management system is configured to store and process data associated with the mission of the unmanned vehicle.

16. The unmanned vehicle management system of claim 15, wherein the data associated with the mission is centrally managed and processed by the centralized data management system to be distributed in different portions or versions that are separably accessible on at least one particular client device of a plurality of client devices.

17. The unmanned vehicle management system of claim 15, wherein the code of the unmanned vehicle is in the wireless signal format and includes at least one of (i) a wireless communication protocol comprising Bluetooth®, Bluetooth® Low Energy (BLE), ZigBee, or Near Field Communication (NFC); (ii) an optical communication medium using infrared (IR) signals; or (iii) an acoustic communication medium using auditory signals or ultrasonic signals.

18. The unmanned vehicle management system of claim 15, wherein the code of the unmanned vehicle is in the physical format and contained by or attached to a housing of the unmanned vehicle, wherein the code includes at least one of a QR code, a text-based code, or a graphic-based code.

19. A system for confidential mission management of an unmanned vehicle, comprising:

an unmanned vehicle comprising an electronics unit and having a code configured in a physical format or a wireless signal format that is linked to the unmanned vehicle; and a data management system comprising one or more computing devices, the one or more computing devices comprising a processor and a memory coupled to the processor and storing instructions that, when executed by the processor, cause the data management system to perform operations comprising:

generating or receiving the code of the unmanned vehicle, wherein the code is associated with information pertaining to a mission of the unmanned vehicle, processing the information pertaining to the mission into a plurality of data sets, where each data set is associated with a portion of the mission and a configuration of the unmanned vehicle corresponding to the portion of the mission, receiving a first input data including the code from a first client device of a first remote user that is located at a first location node of the mission, wherein the code was obtained by the first client device by the first client device acquiring the code from the unmanned vehicle at the first location node, processing the first input data to determine a first set of operation instructions to be implemented by the first remote user at the first location node to affect the unmanned vehicle, wherein the first set of operation instructions includes at least one of a first maintenance task for the unmanned vehicle, a first refueling task of the unmanned vehicle, or a first payload loading, payload unloading, or payload modification task for the unmanned vehicle, transmitting the first set of operation instructions to the first client device, processing the first input data to determine a first set of flight instructions to be implemented by the unmanned vehicle to affect a flight plan of the unmanned vehicle after the first location node, wherein the first set of flight instructions includes at least one of a travel plan, a propulsion plan, or a navigation plan for the unmanned vehicle;

transmitting the first set of flight instructions to the unmanned vehicle;

receiving a second input data including the code at a second client device of a second remote user located at a second location node of the mission, wherein the code was obtained by the second client device by a scan of the code from the unmanned vehicle at the second location node;

processing, at the data management system, the second input data to determine a second set of operation instructions to be implemented by the unmanned vehicle or by the second remote user to affect the unmanned vehicle, wherein the second set of operation instructions include at least one of a second maintenance task for the unmanned vehicle, a second refueling task of the unmanned vehicle, or a second payload loading, payload unloading, or payload modification task for the unmanned vehicle; and transmitting the second set of operation instructions to the second client device, wherein the second set of operation instructions and the first set of operation instructions are different and associated with different data segmentations of the information.

20. The method of claim 1, further comprising: processing, at the data management system, the second input data to determine a second set of flight instructions to be implemented by the unmanned vehicle to affect the flight plan of the unmanned vehicle after the second location node, wherein the second set of flight instructions includes at least one of a travel plan, a propulsion plan, or a navigation plan for the unmanned vehicle; and transmitting, by the data management system, the second set of flight instructions to the unmanned vehicle.

* * * * *